US006488729B1

United States Patent
Ishitobi et al.

(10) Patent No.: US 6,488,729 B1
(45) Date of Patent: Dec. 3, 2002

(54) POLISHING COMPOSITION AND METHOD

(75) Inventors: Ken Ishitobi, Shiojiri (JP); Masahiro Nozaki, Nagoya (JP); Tadanori Nagao, Nagoya (JP); Yoshiki Hayashi, Nagoya (JP)

(73) Assignees: Showa Denko K.K., Tokyo (JP); Yamaguchi Seiken Kogyo K.K., Aichi (JP)

( * ) Notice: Subject to any disclaimer, the term of this patent is extended or adjusted under 35 U.S.C. 154(b) by 0 days.

(21) Appl. No.: 09/672,774

(22) Filed: Sep. 29, 2000

Related U.S. Application Data

(60) Provisional application No. 60/186,284, filed on Mar. 1, 2000.

(30) Foreign Application Priority Data

Sep. 30, 1999 (JP) .............................................. 11-279112

(51) Int. Cl.$^7$ .......................... B24B 1/00; H01L 21/304
(52) U.S. Cl. .............................. 51/307; 51/308; 51/309; 106/3; 106/5; 216/89; 216/96; 216/102; 216/103; 510/165; 510/167; 510/397
(58) Field of Search ...................... 51/307, 308, 309; 106/3, 5; 252/79.2, 79.4; 438/692, 693; 216/89, 96, 102, 103; 510/165, 167, 397

(56) References Cited

U.S. PATENT DOCUMENTS

| | | | | |
|---|---|---|---|---|
| 3,715,842 A | * | 2/1973 | Tredinnick et al. ........... 51/308 |
| 4,645,561 A | | 2/1987 | Rea ............................. 156/636 |
| 4,915,710 A | | 4/1990 | Miyazaki et al. .............. 51/309 |
| 4,956,015 A | * | 9/1990 | Okajima et al. .............. 51/308 |
| 5,266,088 A | * | 11/1993 | Sandusky et al. ............. 51/309 |
| 5,352,277 A | * | 10/1994 | Sasaki et al. ................. 51/309 |
| 5,366,542 A | * | 11/1994 | Yamada et al. ............... 51/309 |
| 5,997,620 A | * | 12/1999 | Kodama et al. ............... 106/3 |
| 6,007,592 A | * | 12/1999 | Kasai et al. ................. 51/309 |
| 6,117,220 A | * | 9/2000 | Kodama et al. ............... 106/3 |
| 6,162,268 A | * | 12/2000 | Knapp et al. ................. 51/309 |
| 6,193,790 B1 | * | 2/2001 | Tani ............................. 51/309 |
| 6,258,140 B1 | * | 7/2001 | Shemo et al. ................. 51/309 |
| 6,280,490 B1 | * | 8/2001 | Rader et al. .................. 51/309 |

FOREIGN PATENT DOCUMENTS

| | | | |
|---|---|---|---|
| EP | 842997 A | 5/1998 | ........... C09K/3/14 |
| EP | 967260 A | 12/1999 | ........... C09G/1/02 |
| JP | 62-25187 | 2/1987 | ........... C09K/3/14 |
| JP | 1-263186 | 10/1989 | ........... C09K/3/14 |
| JP | 2-84485 | 3/1990 | ........... C09K/3/14 |
| JP | 5-2747 | 1/1993 | ........... G11B/5/84 |
| JP | 5-89459 | 4/1993 | ........... G11B/5/84 |
| JP | 7-216345 | 8/1995 | ........... C09K/3/14 |

OTHER PUBLICATIONS

Patent Abstracts of Japan, vol. 1995, No. 11, Dec. 26, 1995 and JP 07 216345 A (Fujimi Inkooporeetetsudo: KK), Aug. 15, 1995 cited in the application abstract.

* cited by examiner

*Primary Examiner*—Michael Marcheschi
(74) *Attorney, Agent, or Firm*—Sughrue Mion, PLLC

(57) ABSTRACT

To provide a polishing composition which enables maintenance of excellent properties and high quality of the surface of a hard disk without lowering polishing rate during polishing of the surface, and which can provide a polished surface in which the amount of dub-off is considerably reduced as compared with that of a conventional level, a polishing composition containing water, a polishing material (particularly alumina), a polishing accelerator, and at least one of hydroxypropyl cellulose and hydroxyalkyl alkyl cellulose is provided.

12 Claims, 1 Drawing Sheet

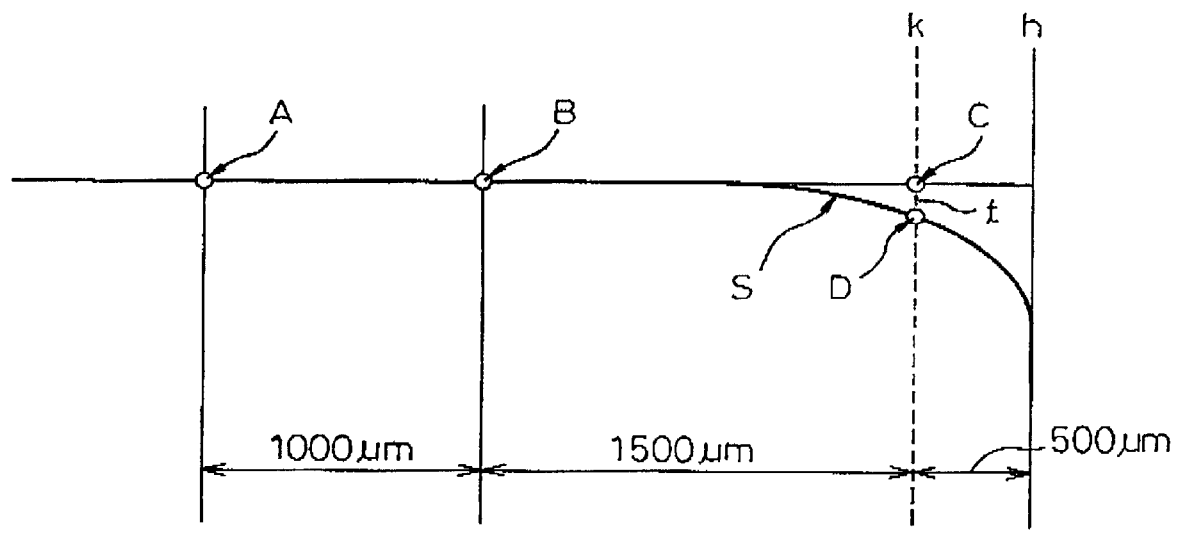

POLISHING COMPOSITION AND METHOD

CROSS REFERENCE TO THE RELATED APPLICATION

This patent application is entitled to the benefit of the priority based on U.S. Provisional Application No. 60/186,284 filed on Mar. 1, 2000.

BACKGROUND OF THE INVENTION

1. Technical Field

The present invention relates to a polishing composition which is employed for precise polish-finishing of metal, plastic, or glass, particularly employed for precise finishing of the surface of an aluminum magnetic disk (hereinafter the disk will be referred to as a "hard disk") which is installed in a hard disk drive of a computer.

2. Description of the Related Art

In recent years, as high-performance computers have been developed and computers have been downsized, there has been demand for high-quality mirror-surface finishing in hard disks without surface defects, in accordance with an increase in recording density of the disks. In order to meet such demand for surface finishing, there have been attained a variety of technical developments on polishing compositions, polishing pads, polishing machines, and polishing techniques.

For example, Japanese Patent Application Laid-Open (kokai) No. 62-25187 discloses a polishing composition containing an inorganic salt, serving as a polishing accelerator, such as nickel nitrate or aluminum nitrate for increasing polishing rate. Japanese Patent Application Laid-Open (kokai) No. 2-84485 discloses a polishing composition which contains an organic acid such as gluconic acid or lactic acid, and a sodium salt thereof for increasing polishing rate, and which can provide a polished surface with reduced surface defects. Japanese Patent Application Laid-Open (kokai) No. 7-216345 discloses a polishing composition which contains an organic acid, a molybdic acid salt, and alumina sol so as to attain a high polishing rate and a polished surface with reduced surface defects. These polishing compositions have been developed in order to maintain high rate of polishing a hard disk, reduce surface roughness and surface defects, and increase recording density.

Meanwhile, Japanese Patent Application Laid-Open (kokai) Nos. 5-2747 and 5-89459 disclose methods for reducing dub-off at the circumferential end of a hard disk and for increasing recording area, in order to increase recording capacity per hard disk. However, these publications do not disclose a polishing composition, although they disclose conditions for polishing. Japanese Patent Application Laid-Open (kokai) No. 1-263186 discloses a polishing composition containing triethanolamine carboxylic acid, triethanol hydrochloride, and aluminum stearate for reducing the amount of dub-off. However, since hard disks these days must meet very strict requirements concerning surface roughness, such a polishing composition cannot be directly applied to high-precision finishing of polished surfaces.

The polishing compositions disclosed in the above publications have been developed in order to enhance polishing rate, to reduce surface defects such as micro-pits and micro-protrusions as well as scratches on the surface of a hard disk for improvement of quality, and to reduce surface roughness for increasing recording density. Incidentally, there has been demand for increasing recording capacity in a hard disk of conventional size. In order to increase recording capacity of a hard disk, recording density per unit area in the disk must be increased, However, during polishing of a hard disk, the circumference of the disk is excessively polished to form a curve portion. Such an unavoidable curve portion is called "dub-off" or "roll-off," and a region containing dub-off-in a hard disk cannot be employed for recording. If the amount of dub-off can be reduced as much as possible, recording capacity per hard disk can be increased. Therefore, there has been demand for minimizing the amount of dub-off in a hard disk.

In view of the foregoing, an object of the present invention is to provide a polishing composition and method which can maintain polishing rate during polishing of the surface of a hard disk, maintain excellent properties and high quality of the surface of the disk, and provide a finished surface in which the amount of dub-off is considerably reduced as compared with that of a conventional level.

SUMMARY OF THE INVENTION

The present invention provides a polishing composition comprising water, a polishing material (particularly alumina), a polishing accelerator, and at least one of hydroxypropyl cellulose (hereinafter abbreviated as "HPC") and hydroxyalkyl alkyl cellulose (hereinafter abbreviated as "HRRC"). The polishing composition is mainly employed for polishing the surface of a hard disk which is installed in a computer, but is not limited thereto. Particularly, the composition can provide a finished surface in which the amount of dub-off is considerably reduced as compared with that of a conventional level, while maintaining high polishing rate, high surface quality, and excellent surface roughness. The present invention also provides a method for polishing a workpiece using such a polishing composition.

BRIEF DESCRIPTION OF DRAWINGS

FIG. 1 is a schematic representation employed for explanation of determination of the amount of dub-off, in which S: Curve in the vicinity of the circumferential end of a disk, which is drawn by use of a surfcorder h: Perpendicular line brought into contact with the circumferential end of a disk A: Point on the curve which is 3,000 $\mu$m from perpendicular line h B: Point on the curve which is 2,000 $\mu$m from perpendicular line h C: Point on a linear line passing through points A and B, which is 500 $\mu$m from perpendicular line h k: Perpendicular line passing through point C D: Point at which perpendicular line k and curve S cross t: Length between point C and point D (the amount of dub-off)

DETAILED DESCRIPTION OF THE INVENTION

An unavoidable phenomenon during polishing by use of free abrasive grains is occurrence of dub-off in a polished disk. The mechanism of dub-off is not necessarily clarified. However, through performing polishing operation over years, it has been found that when polishing rate is high, the amount of dub-off of a disk is reduced, but surface roughness generally increases and protrusions tend to be generated on the disk; and that when polishing rate is low, the amount of dub-off of a disk increases and pits tend to be generated on the disk. Meanwhile, it has been found that when a disk sinks deeply into a polishing pad, the amount of dub-off of the disk tends to increase. On the basis of these findings, extensive studies have been performed on a variety of additives, for example, in order to increase the viscosity of a polishing solution while the performance of a polishing material contained in the solution is maintained. The polishing composition of the present invention has been accomplished on the basis of the studies.

In the present invention, the amount of dub-off is determined as follows, as described with reference to FIG. 1.

As shown in FIG. 1, a circumferential portion of a polished hard disk is traced along the surface by use of a surfcorder to draw a curve S. A perpendicular line h is drawn along the circumferential end of the curve S. Points on the curve S which are 3,000 μm and 2,000 μm from the perpendicular line h towards the center of the disk are assigned A and B, respectively. On a linear line passing the points A and B, a point which is 500 μm from the perpendicular line h is assigned C. A perpendicular line k is drawn so as to pass the point C, and a point at which the perpendicular line k and the curve S cross is assigned D. The length t between the points C and D is determined as the amount of dub-off of the disk.

In order to confirm the effect of a thickener for reducing dub-off, a variety of polymers were evaluated in terms of water-solubility or other properties. Consequently, it was found that when hydroxypropyl cellulose (HPC) or hydroxyalkyl alkyl cellulose such as hydroxypropyl methyl cellulose (HPMC), hydroxyethyl methyl cellulose (HEMC), or ethyl hydroxyethyl cellulose (EHEC), which has a more steric fiber structure among water-soluble cellulose derivatives, is added to a polishing composition, the polishing composition can provide an excellent polished surface with a small amount of dub-off while high polishing rate and high surface accuracy are maintained.

The mechanism of reduction in the amount of dub-off through the addition of HPC, HPMC, HEMC, or EHEC has not yet been elucidated, but the molecular structure or the type of end group of cellulose ether and thickening through the addition of the cellulose may be attributed to reduction in the amount of dub-off.

No particular limitation is imposed on the form of crystal structure, such as α, θ, or γ, of alumina which is preferably employed as a polishing material in the present invention, but α-alumina is more preferable in consideration of polishing rate. The particle size of alumina is determined according to the desired surface roughness of a disk. The mean particle size of alumina is generally 0.02–5 μm, preferably 0.1–3 μm. The particle size distribution of alumina may be preferably as narrow as possible. The amount of alumina may be 1–30 wt. % on the basis of the entirety of a polishing composition, preferably 3–20 wt. %.

A polishing material which is employed in the present invention is not limited to alumina, and silica, titania, zirconia, or cerium oxide may be employed to obtain an effect similar to that of alumina. These polishing materials may be employed in combination.

The particle size and the amount of the polishing material which is employed may be determined in a manner similar to the case in which alumina is employed, but particle size and amount may be changed.

A polishing accelerator which may be employed in the present invention may be an organic acid or an inorganic acid salt. An organic acid is at least one species selected from the group consisting of malonic acid, succinic acid, adipic acid, lactic acid, malic acid, citric acid, glycine, aspartic acid, tartaric acid, gluconic acid, heptogluconic acid, iminodiacetic acid, and fumaric acid. Meanwhile, an inorganic acid salt is at least one species selected from the group consisting of sodium sulfate, magnesium sulfate, nickel sulfate, aluminum sulfate, ammonium sulfate, nickel nitrate, aluminum nitrate, ammonium nitrate, ferric nitrate, aluminum chloride, and nickel sulfamate. The amount of an organic acid or an inorganic acid salt which is incorporated into the polishing composition is preferably 0.003–10 wt. % on the basis of the entirety of the composition.

A polishing accelerator which may be employed in the present invention may be a combination of an organic acid and at least one of an organic acid salt and an inorganic acid salt. An organic acid is at least one species selected from the group consisting of malonic acid, succinic acid, adipic acid, lactic acid, malic acid, citric acid, glycine, aspartic acid, tartaric acid, gluconic acid, heptogluconic acid, iminodiacetic acid, and fumatic acid. An organic acid salt which is employed in combination with the organic acid may be a potassium salt, sodium salt, or ammonium salt of the above organic acid. An inorganic acid salt which is employed in combination with the organic acid is at least one species selected from the group consisting of sodium sulfate, magnesium sulfate, nickel sulfate, aluminum sulfate, ammonium sulfate, nickel nitrate, aluminum nitrate, ammonium nitrate, ferric nitrate, aluminum chloride, and nickel sulfamate. when a combination of an organic acid and an organic acid salt or a combination of an organic acid and an inorganic acid salt is employed, the amount of the combination which is incorporated into the polishing composition is preferably 0.01–10 wt. % on the basis of the entirety of the composition. In this case, the amount of an organic acid is preferably at least 0.003 wt. % on the basis of the entirety of the composition.

When a combination of an organic acid and an organic acid salt is employed as a polishing accelerator, an organic acid and a salt of the same organic acid are preferably employed in combination so as to obtain excellent polishing properties of the composition.

The amount of HPC, HPMC, HEMC, or EHEC, which is employed in the polishing composition of the present invention singly or in combination, is 0.001–2 wt. % on the basis of the entirety of the composition. When the amount is very small, the effect of reducing dub-off is not obtained, whereas when the amount is very large, polishing rate decreases. The amount is preferably 0.01–1.0 wt. % on the basis of the entirety of the composition.

The aforementioned amount of each component in the polishing composition is the amount when the composition is employed for polishing a hard disk substrate. Therefore, it is efficient that the polishing composition containing each component in an amount larger than that described above is produced and transported, and the composition is diluted upon use such that the amount of the component becomes as described above.

If necessary, in the polishing composition of the present invention, there may be employed, as an additive, alumina sol, a surfactant, a cleaning agent, a rust preventive, a preservative, a pH regulating agent, and a surface modification agent such as sulfamic acid or phosphoric acid which is known to exhibit the effect for reducing surface defects.

The polishing composition of the present invention preferably has a pH of 2–6.

EXAMPLES

The present invention will next be described in more detail by way of examples, which should not be construed as limiting the invention thereto.

Examples 1 through 15 are shown in Table 1, and Comparative Examples 1 through 6 are shown in Table 2.

(Preparation of polishing composition)

Aluminum hydroxide was heated at about 1,200° C. in air in a firing furnace, to thereby obtain α-alumina. The thus-obtained α-alumina was crushed and subjected to wet-classification, thereby preparing alumina samples having mean particle sizes of 0.6 μm, 0.7 μm, and 1.0 μm.

Subsequently, on the basis of compositions shown in Tables 1 and 2, water, alumina, a polishing accelerator, and HPC, HPMC, HEMC, or EHEC were weighed, incorporated, and mixed, to thereby prepare a polishing composition sample.

(Polishing conditions)

An NiP-plated aluminum disk (size: 3.5 inch) was employed as a workpiece to be polished. A polishing test and evaluation of the disk were carried out under the following conditions.

Polishing test conditions

Polishing test machine:
 9B double-sided polishing machine (product of System Seiko K.K.)

Polishing pad: Politex DG

Number of revolutions of surface plate:
 upper surface plate 28 rpm,
 lower surface plate 45 rpm,
 Sun gear 8 rpm Feed rate of slurry: 100 ml/min.

Polishing time: 5 minutes operation pressure: 80 g/cm$^2$

Evaluation of disk

Polishing rate: calculated by difference in weight before and after polishing the disk Quality of polished surface:
 pits, protrusions, and scratches on disks were observed under a microscope, and rating "good" was assigned when the total number of pits is not more than 10 for both sides of five disks, the total number of protrusions is 0 for both sides of five disks, and the total number of scratches is not more than 5 for both sides of one disk Amount of dub-off:
 measured by use of a surfcorder (model: SE-30D, product of Kosaka Kenkyujo) (measured as shown in FIG. 1)

The results of polishing test of Examples and Comparative Examples are shown in Tables 1 and 2, respectively.

TABLE 1

| | α-Alumina | | Polishing accelerator | | | | | Evaluation of polishing | | |
|---|---|---|---|---|---|---|---|---|---|---|
| Ex. | Particle Size $D_{50}$ μm | Amount % | Organic acid Type | % | Organic acid salt/ inorganic acid salt Type | % | HPC/ HRRC % | Polishing rate μm/min | Surface defect — | Amount of dub-off Å |
| 1 | 0.7 | 6 | Lactic acid | 0.5 | Sodium lactate | 1.0 | HPC 0.1 | 1.13 | Good | 300 |
| 2 | 0.6 | 6 | Lactic acid | 0.5 | Sodium lactate | 1.0 | HPC 0.1 | 0.78 | Good | 650 |
| 3 | 0.7 | 6 | lactic acid | 4.0 | Sodium lactate | 5.0 | HPC 1.0 | 1.15 | Good | 350 |
| 4 | 1.0 | 6 | Malic acid | 0.7 | Sodium malate | 0.2 | HPC 0.1 | 1.35 | Good | 100 |
| 5 | 0.7 | 6 | Malic acid | 0.7 | Sodium malate | 0.2 | HPC 0.1 | 1.24 | Good | 450 |
| 6 | 0.6 | 6 | Malic acid | 0.7 | Sodium malate | 0.2 | HPC 0.1 | 0.88 | Good | 600 |
| 7 | 0.7 | 6 | Malic acid | 0.7 | Sodium malate | 0.2 | HPC 1.0 | 1.04 | Good | 450 |
| 8 | 0.7 | 6 | Malic acid | 5.0 | Sodium malate | 4.0 | HPC 1.0 | 1.25 | Good | 500 |
| 9 | 0.7 | 6 | Malic acid | 0.7 | Sodium malate | 0.2 | HPMC 0.1 | 1.22 | Good | 450 |
| 10 | 0.7 | 6 | Malic acid | 0.7 | Sodium malate | 0.2 | HPMC 0.1 | 1.21 | Good | 500 |
| 11 | 0.7 | 6 | Gluconic acid | 0.5 | Sodium gluconate | 0.5 | HPC 0.1 | 0.98 | Good | 400 |
| 12 | 0.6 | 6 | Gluconic acid | 0.5 | Sodium gluconate | 0.5 | HPC 0.1 | 0.73 | Good | 500 |
| 13 | 0.7 | 6 | Lactic acid | 0.5 | — | — | HPC 0.1 | 1.02 | Good | 350 |
| 14 | 0.7 | 6 | Malic acid | 0.7 | Nickel sulfate | 0.3 | HPC 0.1 | 1.09 | Good | 450 |
| 15 | 0.7 | 6 | — | — | Aluminum nitrate | 1.0 | HPC 0.1 | 1.13 | Good | 400 |

TABLE 2

| | α-Alumina | | Polishing accelerator | | | | | Evaluation of polishing | | |
|---|---|---|---|---|---|---|---|---|---|---|
| Comp. Ex. | Particle Size $D_{50}$ μm | Amount % | Organic acid Type | % | Organic acid salt/ inorganic acid salt Type | % | HPC/ HRRC % | Polishing rate μm/min | Surface defect — | Amount of dub-off Å |
| 1 | 0.7 | 6 | Lactic acid | 0.5 | Sodium lactate | 1.0 | 0 | 1.18 | Good | 800 |
| 2 | 1.0 | 6 | Malic acid | 0.7 | Sodium malate | 0.2 | 0 | 1.27 | Good | 1000 |
| 3 | 0.7 | 6 | Malic acid | 0.7 | Sodium malate | 0.2 | 0 | 1.18 | Good | 1400 |
| 4 | 0.6 | 6 | Malic acid | 0.7 | Sodium malate | 0.2 | 0 | 0.93 | Good | 1900 |
| 5 | 0.7 | 6 | Gluconic acid | 0.5 | Sodium gluconate | 0.5 | 0 | 1.08 | Good | 1600 |
| 6 | 0.6 | 6 | Gluconic acid | 0.5 | Sodium gluconate | 0.5 | 0 | 0.81 | Good | 2100 |

As is apparent from comparison of Table 1 with Table 2, when HPC, HPMC, or HEMC is incorporated into a polishing composition, the amount of dub-off is reduced; i.e., the composition is improved.

As described above, the polishing composition of the present invention comprising water, alumina, a polishing accelerator, and at least one of HPC and HRRC enables maintenance of a predetermined polishing rate, surface accuracy, and mirror surface without surface defects, and can provide excellent polishing performance so as to reduce the amount of dub-off.

What is claimed is:

1. A method for precision polishing of a hard-disc, comprising polishing a hard-disc with a polishing composition comprising water, a polishing material, a polishing accelerator, and at least one of hydroxypropyl cellulose or hydroxyalkyl alkyl cellulose.

2. A method for precision polishing according to claim 1, wherein said hard-disc is an aluminum magnetic disk substrate.

3. A method for precision polishing according to claim 1, wherein the polishing material is selected from the group consisting of alumina, silica, titania, zirconia, and ceria.

4. A method for precision polishing according to claim 1, wherein the polishing material is alumina.

5. A method for precision polishing according to claim 1, wherein the polishing accelerator comprises an organic acid or an inorganic acid salt.

6. A method for precision polishing according to claim 1, wherein the polishing accelerator comprises an organic acid and at least one of an organic acid salt or an inorganic acid salt.

7. A method for precision polishing according to claim 5, wherein the organic acid is at least one species selected from the group consisting of malonic acid, succinic acid, adipic acid, lactic acid, malic acid, citric acid, glycine, aspartic acid, tartaric acid, gluconic acid, heptogluconic acid, iminodiacetic acid, and fumaric acid.

8. A method for precision polishing according to claim 5, wherein the inorganic acid salt is at least one species selected from the group consisting of sodium sulfate, magnesium sulfate, nickel sulfate, aluminum sulfate, ammonium sulfate, nickel nitrate, aluminum nitrate, ammonium nitrate, ferric nitrate, aluminum chloride, and nickel sulfamate.

9. A method for precision polishing according to claim 6, wherein the organic acid salt is a potassium salt, a sodium salt or an ammonium salt of malonic acid, succinic acid, adipic acid, lactic acid, malic acid, citric acid, glycine, aspartic acid, tartaric acid, gluconic acid, heptogluconic acid, iminodiacetic acid, or fumaric acid.

10. A method for precision polishing according to claim 1, wherein the amount of the polishing accelerator is 0.01–10 wt. % based on the total composition.

11. A method for precision polishing according to claim 1, wherein the hydroxylalkyl alkyl cellulose is at least one species selected from the group consisting of hydroxypropyl methyl cellulose, hydroxyethyl methyl cellulose, and ethyl hydroxyethyl cellulose.

12. A method for precision polishing according to claim 1, wherein the amount of hydroxypropyl cellulose and/or hydroxyalkyl alkyl cellulose is 0.001–2 wt. % based on the total composition.

* * * * *